United States Patent
Perrin et al.

(10) Patent No.: US 11,249,325 B2
(45) Date of Patent: Feb. 15, 2022

(54) METHOD FOR DETERMINING THE OPTICAL POWER OF AN OPTICAL LENS

(71) Applicant: Essilor International, Charenton-le-Pont (FR)

(72) Inventors: Jean-Luc Perrin, Charenton-le-Pont (FR); Damien Paille, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 174 days.

(21) Appl. No.: 15/749,681

(22) PCT Filed: Jul. 26, 2016

(86) PCT No.: PCT/EP2016/067842
§ 371 (c)(1),
(2) Date: Feb. 1, 2018

(87) PCT Pub. No.: WO2017/021239
PCT Pub. Date: Feb. 9, 2017

(65) Prior Publication Data
US 2018/0224667 A1  Aug. 9, 2018

(30) Foreign Application Priority Data
Aug. 3, 2015 (EP) .................................. 15306261

(51) Int. Cl.
G02C 7/02 (2006.01)
G02C 7/06 (2006.01)
(52) U.S. Cl.
CPC ............. *G02C 7/027* (2013.01); *G02C 7/025* (2013.01); *G02C 7/066* (2013.01)
(58) Field of Classification Search
CPC .......... G02C 7/02; G02C 7/022; G02C 7/024; G02C 7/025; G02C 7/027; G02C 7/028;
(Continued)

(56) References Cited

U.S. PATENT DOCUMENTS

| | | | | | |
|---|---|---|---|---|---|
| 1,454,774 | A | * | 5/1923 | Tillyer | ............ A61B 3/02 351/239 |
| 6,286,957 | B1 | * | 9/2001 | Livnat | ............ A61B 3/111 351/204 |

(Continued)

FOREIGN PATENT DOCUMENTS

| EP | 2 348 350 A1 | 7/2011 |
|---|---|---|
| EP | 2 369 403 A1 | 9/2011 |

(Continued)

OTHER PUBLICATIONS

International Search Report and Written Opinion dated Oct. 14, 2016, in PCT/EP2016/067842, filed Jul. 26, 2016.

*Primary Examiner* — Nicholas R. Pasko
(74) *Attorney, Agent, or Firm* — Oblon, McClelland, Maier & Neustadt, L.L.P.

(57) ABSTRACT

A method for determining optical power of an optical lens to be placed in front of an eye of a person, the method including: a first distance determining during which a first gazing distance is determined, which is the distance between the eye of the person and a first visual stimulus when the person gazes at the first visual stimulus in a given gazing direction with a first level of attention: a second distance determining during which a second gazing distance is determined, which is the distance between the eye of the person and a second visual stimulus when the person gazes at the second visual stimulus in the given gazing direction with a second level of attention different from the first level of attention; and an optical power determining during which the optical power adapted for the person is determined based on the first and second gazing distances.

13 Claims, 5 Drawing Sheets

(58) Field of Classification Search
CPC ..... A61B 3/0091; A61B 3/028; A61B 3/0285;
A61B 3/032
USPC ............ 351/159.41, 159.42, 159.52, 159.53,
351/159.71, 159.72, 159.73, 159.74,
351/159.75, 159.76, 159.77
See application file for complete search history.

(56) References Cited

U.S. PATENT DOCUMENTS

| | | | | |
|---|---|---|---|---|
| 6,827,443 | B2* | 12/2004 | Fisher | G02C 7/027 |
| | | | | 351/209 |
| 7,370,964 | B2* | 5/2008 | Wakil | A61B 3/0091 |
| | | | | 351/203 |
| 7,540,611 | B2* | 6/2009 | Welk | G02C 7/025 |
| | | | | 351/159.76 |
| 7,740,358 | B2* | 6/2010 | Pedrono | G02C 7/061 |
| | | | | 351/246 |
| 7,980,692 | B2* | 7/2011 | Fisher | G02C 7/027 |
| | | | | 351/159.74 |
| 8,322,855 | B2* | 12/2012 | Gimenez Carol | A61B 3/113 |
| | | | | 351/209 |
| 2005/0122472 | A1 | 6/2005 | Fisher et al. | |
| 2011/0128496 | A1* | 6/2011 | Giraudet | G02C 7/061 |
| | | | | 351/204 |
| 2011/0170058 | A1* | 7/2011 | Suzuki | G02C 7/027 |
| | | | | 351/159.75 |
| 2011/0222019 | A1* | 9/2011 | Suzuki | G02C 7/025 |
| | | | | 351/159.42 |
| 2012/0212705 | A1* | 8/2012 | Calixte | G02C 7/027 |
| | | | | 351/159.74 |
| 2013/0057825 | A1* | 3/2013 | Kato | G02C 13/003 |
| | | | | 351/159.42 |
| 2013/0215379 | A1* | 8/2013 | Sayag | A61B 3/14 |
| | | | | 351/159.42 |
| 2015/0109575 | A1 | 4/2015 | Drobe et al. | |
| 2015/0286070 | A1* | 10/2015 | Aikawa | A61B 3/0091 |
| | | | | 351/159.76 |

FOREIGN PATENT DOCUMENTS

| | | |
|---|---|---|
| WO | 03/052491 A1 | 6/2003 |
| WO | 2014/001491 A1 | 1/2014 |

* cited by examiner

METHOD FOR DETERMINING THE OPTICAL POWER OF AN OPTICAL LENS

FIELD OF THE INVENTION

The invention relates to a method for determining the optical power of an optical lens to be placed in front of the eye of a person and adapted for said person, a method for determining a dioptric function of an optical lens adapted for a person and a method for manufacturing an optical lens.

BACKGROUND OF THE INVENTION

Usually, a person wishing to get optical equipment goes to see an eye care practitioner.

The person may be prescribed a positive or negative optical power correction. For presbyopic wearers, the value of the power correction is different for far vision and near vision, due to the difficulties of accommodation of his eyes in near vision. The prescription thus comprises a far-vision power value and an addition representing the power increment between far vision and near vision. The addition is qualified as prescribed addition. Ophthalmic lenses suitable for presbyopic wearers are multifocal lenses, the most suitable lenses being progressive multifocal lenses.

The optical powers are usually determined to allow the person to carry out several activities, for example near distance activity may be reading or doing knitting, intermediate distance activity may be use of a computer; cooking and far distance activity may be driving or playing golf.

Conventionally, each distant activity is associated to a zone of the optical lens through which the person is to seek when carrying out such activity and every zone of the optical lens is associated to a distance. Typically the near vision zone is associated to a viewing distance of 40 cm; the intermediate vision zone is associated to a distance of 1 m and the far vision zone to a distance of 5 m.

Therefore, when determining the adapted optical power for the person, the eye care practitioner carries out tests at such predetermined distance. For example to determine the optical power of the near vision zone, the eye care practitioner carries out vision tests at a distance of 40 cm.

Although such practice provides good results in average, some person may carry out most of their near vision activities at a different distance than 40 cm. Therefore, determining the near vision optical power at 40 cm for every person may lead to unsatisfactory results. Furthermore, the inventors stated than the working distance for a given activity can vary for a person according to his/her level of attention.

Therefore, there is a need to a more personalized method that would improve the overall satisfaction of the person when wearing a pair of ophthalmic lenses.

One object of the present invention is to provide such method.

SUMMARY OF THE INVENTION

To this end, the invention proposes a method for determining the optical power of an optical lens to be placed in front of the eye of a person and adapted for said person, the method comprising at least:

a first distance determining step during which a first gazing distance is determined, the first gazing distance being the distance between the eye of the person and a first visual stimulus when the person gazes at said first visual stimulus in a given gazing direction with a first level of attention, a second distance determining step during which a second gazing distance is determined, the second gazing distance being the distance between the eye of the person and a second visual stimulus when the person gazes at said second visual stimulus in said given gazing direction with a second level of attention, the second level of attention being different from the first level of attention, an optical power determining step during which the optical power adapted for the person is determined based on the first and second gazing distances.

The inventors have observed that depending on the level of attention of the person when carrying out an activity the distance at which such activity is carried out changes. For example a person when reading a text that requires a high level of attention, for example reading a philosophical essay, may have a tendency to reduce the distance to the text compared to when the person is reading a comic book for example.

Advantageously, the method of the invention allows taking into account such observation when determining the optical power of an ophthalmic lens adapted for the person. Unlike the prior art method, wherein for a given gazing direction a gazing distance is imposed, the method according to the invention allows having different gazing distances for a given gazing direction.

According to further embodiments which can be considered alone or in combination:

the first and second visual stimulus are at a near vision distance, for example carried out at distances smaller than 50 cm; and/or the first and second visual stimulus are texts and the level of attention of the person is adapted based on the complexity of the texts; and/or the first and second visual stimulus are at an intermediate vision distance, for example carried out at distances greater than 50 cm and smaller than 1 m; and/or the first and second visual stimulus are displayed on a computer screen and the level of attention of the person is adapted based on the complexity of the task carried out by the person on the computer; and/or the method further comprises a gazing direction determining step during which said given gazing direction is determined.

The invention also related to a method for determining a dioptric function of an optical lens adapted for a person, the method comprising:

a person data providing step during which person data comprising the person's ophthalmic prescription is provided, the ophthalmic prescription comprising the first and second gazing distances determined according to the method of the invention, a dioptric function determining step during which a dioptric function is determined based at least on the first and second gazing distances.

According to further embodiments which can be considered alone or in combination:

the dioptric function comprises a zone having an optical power determined based on a weighted sum of the first and second gazing distances; and/or the coefficients of the weighted sum are determined based on at least on the frequency and/or amount of time spent daily by the person carrying out said activity with either a first or second level of attention; and/or the dioptric function comprises a first zone having an optical power determined based on the first gazing distance and a second zone having an optical power determined based on the second gazing distance; and/or the wearer data providing step the set of gazing directions of the person upon carrying out the activity are provided, and the first and second zones correspond to extreme gazing directions of the set of gazing directions.

The invention further relates a method for manufacturing an ophthalmic lens adapted to a person comprising:

a lens blank providing step, during which a lens blank is provided, a dioptric function providing step during which a dioptric function determined according to the method according to the invention is provided, a manufacturing step during which the optical lens blank is manufactured based on the dioptric function.

The invention also relates to optical power determining device configured to determine the optical power of an optical lens to be placed in front of the eye of a person and adapted for said person, the device comprising at least:

a distance measuring module configured to measure a distance between an visual stimulus and the eyes of a person, a memory configured to store computer executable instructions; and a processor for executing the computer executable instructions, wherein the computer executable instructions comprises instructions for:

determining a first gazing distance, the first gazing distance being the distance between the eye of the person and a first visual stimulus when the person gazes at said first visual stimulus in a given gazing direction with a first level of attention, determining a second distance, the second gazing distance being the distance between the eye of the person and a second visual stimulus when the person gazes at said second visual stimulus in said given gazing direction with a second level of attention, the second level of attention being different from the first level of attention, determining at least one optical power adapted for the person based on the first and second gazing distances.

The device according to the invention may further comprise a display module configured to display visual stimulus.

The invention further relates to a computer program product comprising one or more stored sequences of instructions that are accessible to a processor and which, when executed by the processor, causes the processor to carry out at least the data collecting step and the personalizing step of the method according to the invention.

The invention also relates to a computer-readable storage medium having a program recorded thereon; where the program makes the computer execute at least the data collecting step and the personalizing step of the method of the invention.

The invention further relates to a device comprising a processor adapted to store one or more sequence of instructions and to carry out at least the data collecting step and the personalizing step of the method according to the invention.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Figure 1:
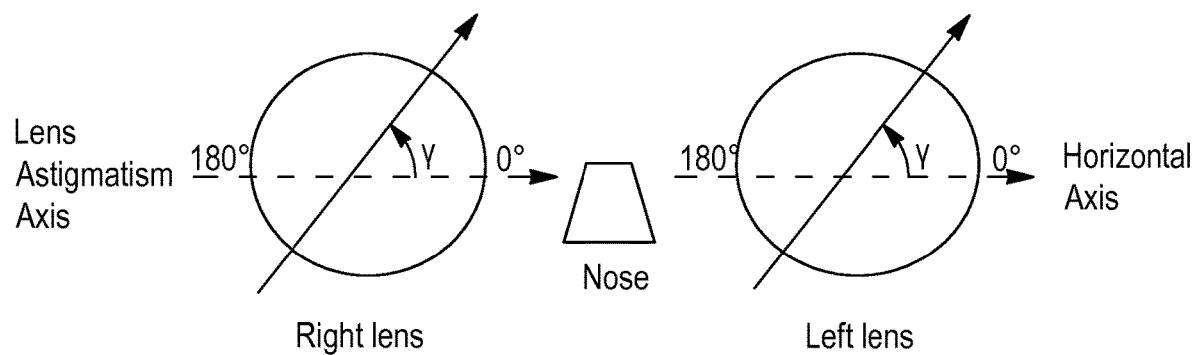
FIG. 1 illustrates the astigmatism axis γ of a lens in the TABO convention.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the sense of the invention, an optical function corresponds to a function providing for each gaze direction the effect of an optical lens on the light ray passing through the optical lens.

The optical function may comprise dioptric function, light absorption, polarizing capability, reinforcement of contrast capacity, etc . . .

The dioptric function corresponds to the optical lens power (mean power, astigmatism etc . . . ) as a function of the gaze direction.

The wording "optical design" is a widely used wording known from the man skilled in the art in ophthalmic domain to designate the set of parameters allowing defining a dioptric function of an ophthalmic lens; each ophthalmic lens designer has its own designs, particularly for progressive ophthalmic lenses. As for an example, a progressive ophthalmic lens "design" results of an optimization of a progressive surface so as to restore a presbyope's ability to see clearly at all distances but also to optimally respect all physiological visual functions such as foveal vision, extrafoveal vision, binocular vision and to minimize unwanted astigmatisms. For example, a progressive lens design comprises:

a power profile along the main gaze directions (meridian line) used by the lens wearer during day life activities, distributions of powers (mean power, astigmatism, . . . ) on the sides of the lens, that is to say away from the main gaze direction.

These optical characteristics are part of the "designs" defined and calculated by ophthalmic lens designers and that are provided with the progressive lenses.

Although the invention is not limited to progressive lenses, the wording used is illustrated in FIGS. 1 to 6 for a progressive lens. The skilled person can adapt the definitions in case of single vision lenses.

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres. It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}}, \text{ and}$$

$$SPH_{min} = (n-1)*CURV_{min} = \frac{n-1}{R_{max}}$$

where n is the index of the constituent material of the lens.

If the surface considered is an eyeball side surface (also referred to as the back surface), the expressions are the following:

$$SPH_{min} = (1-n)*CURV_{min} = \frac{1-n}{R_{max}} \text{ and}$$

$$SPH_{max} = (1-n)*CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} 1/2(SPH_{min}+SPH_{max})$$

The expression of the mean sphere therefore depends on the surface considered:

$$SPH_{mean} = \frac{n-1}{2}\left(\frac{1}{R_{min}} + \frac{1}{R_{max}}\right)$$

if the surface is the object side surface, $$SPH_{mean} = \frac{1-n}{2}\left(\frac{1}{R_{min}} + \frac{1}{R_{max}}\right)$$

if the surface is an eyeball side surface,
a cylinder CYL is also defined by the formula $CYL=|SPH_{max}-SPH_{min}|$.

The characteristics of any aspherical face of the lens may be expressed by the local mean spheres and cylinders. A surface can be considered as locally aspherical when the cylinder is greater than 0.25 diopters.

Figure 2:
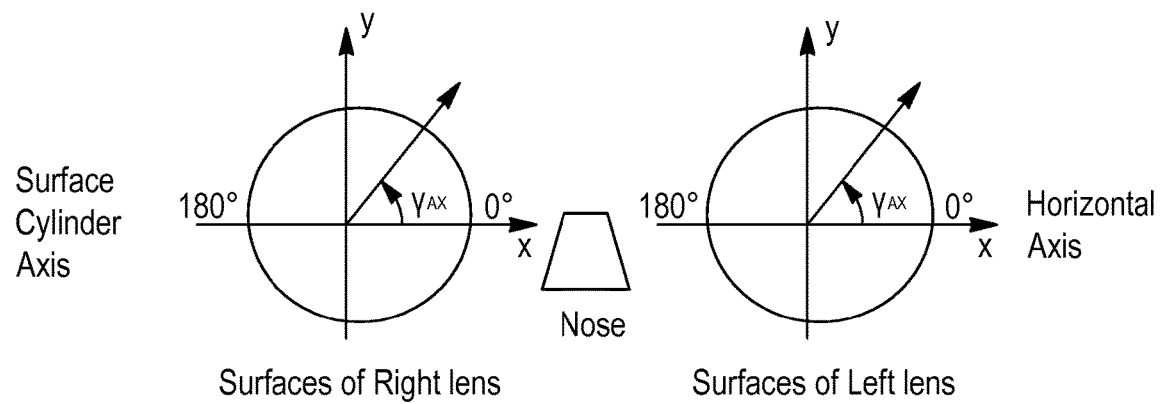
FIG. 2 illustrates the cylinder axis $\gamma_{AX}$ in a convention used to characterize an aspherical surface.

For an aspherical surface, a local cylinder axis $\gamma_{AX}$ may further be defined. FIG. 1 illustrates the astigmatism axis $\gamma$ as defined in the TABO convention and FIG. 2 illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counter-clockwise for each eye, when looking at the wearer) ($0° \leq \gamma_{AX} \leq 180°$). An axis value for the cylinder axis $\gamma_{AX}$ of +45° therefore represents an axis oriented obliquely, which when looking at the wearer, extends from the quadrant located up on the right to the quadrant located down on the left.

Moreover, a progressive multifocal lens may also be defined by optical characteristics, taking into consideration the situation of the person wearing the lenses.

Figure 3:
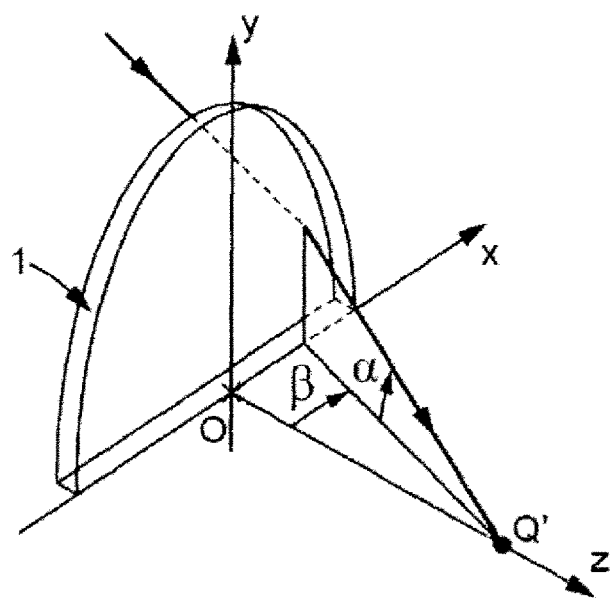
FIGS. 3 and 4 show, diagrammatically, optical systems of eye and lens.
Figure 4:
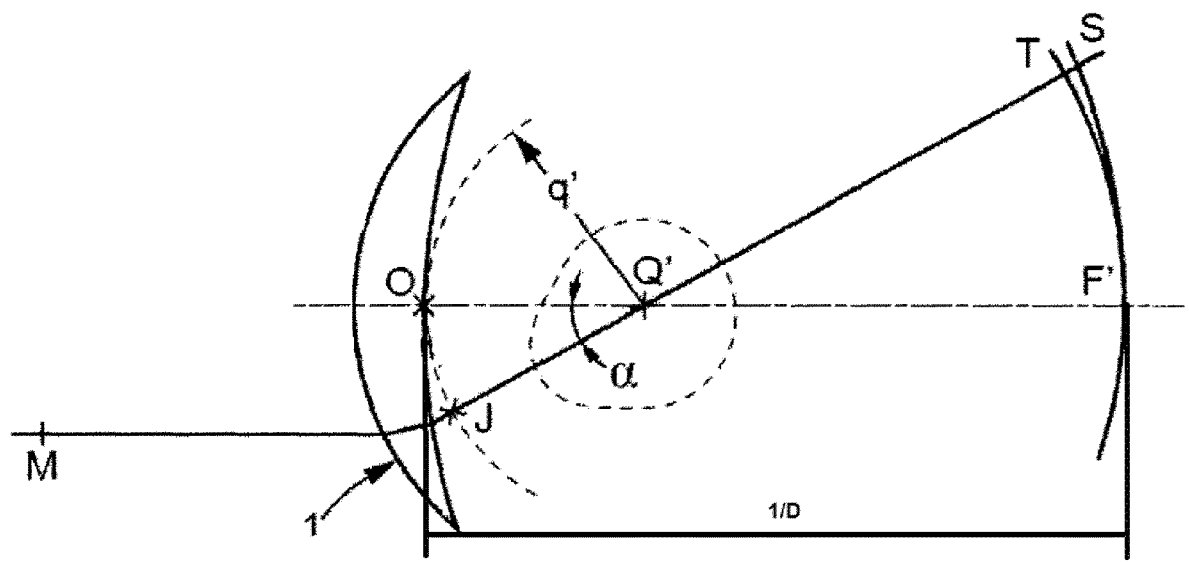

FIGS. 3 and 4 are diagrammatic illustrations of optical systems of eye and lens, thus showing the definitions used in the description. More precisely, FIG. 3 represents a perspective view of such a system illustrating parameters α and β used to define a gaze direction. FIG. 4 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 4 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 3—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 3. The angle α is the angle formed between the axis Q'J and the projection of the straight line Q'J on the horizontal plane comprising the axis Q'F'; this angle appears on the scheme on FIGS. 3 and 4. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, US patent U.S. Pat. No. 6,318,859 may be considered. This document describes an ergorama, its definition and its modeling method. For a method of the invention, points may be at infinity or not. Ergorama may be a function of the wearer's ametropia or wearer's addition.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

ProxO=1/MJ

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

Pui=ProxO+ProxI

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame {Q', $x_m$, $y_m$, $z_m$} linked to the eye. It corresponds to the angle with which the image S or T i formed depending on the convention used with relation to the direction $z_m$ in the plane {Q', $z_m$, $y_m$}.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

Figure 5:
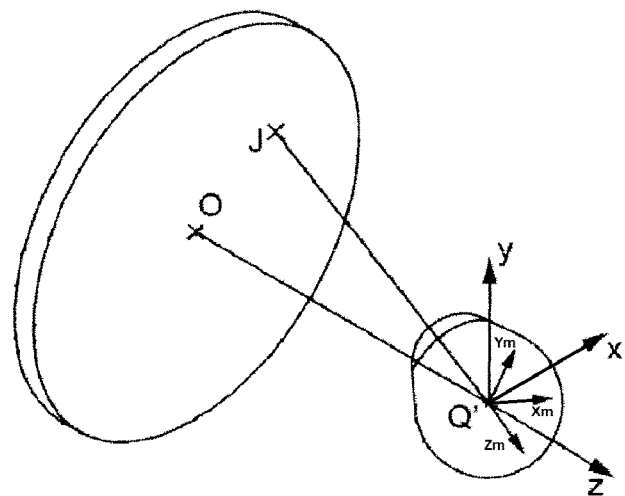
FIG. 5 shows a ray tracing from the center of rotation of the eye.

FIG. 5 represents a perspective view of a configuration wherein the parameters α and β are non zero. The effect of rotation of the eye can thus be illustrated by showing a fixed frame {x, y, z} and a frame {$x_m$, $y_m$, $z_m$} linked to the eye. Frame {x, y, z} has its origin at the point Q'. The axis x is the axis Q'O and it is oriented from the lens toward the eye. The y axis is vertical and oriented upwardly. The z axis is such that the frame {x, y, z} be orthonormal and direct. The frame {$x_m$, $y_m$, $z_m$} is linked to the eye and its center is the point Q'. The $x_m$ axis corresponds to the gaze direction JQ'. Thus, for a primary gaze direction, the two frames {x, y, z} and {$x_m$, $y_m$, $z_m$} are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed in front of the pupil or in front of the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 3-5 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

In the remainder of the description, terms like «up», «bottom 141 , «horizontal», «vertical», «above», «below», or other words indicating relative position may be used. These terms are to be understood in the wearing conditions of the lens. Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame, and preferably to a value along the y axis inferior to the y_value at the fitting cross.

The wearing conditions are to be understood as the position of the ophthalmic lens with relation to the eye of a wearer, for example defined by a pantoscopic angle, a Cornea to lens distance, a Pupil-cornea distance, a ERC to pupil distance, a ERC to lens distance and a wrap angle. ERC denoting the eye rotation center The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The ERC to pupil distance is the distance along the visual axis of the eye between its eye rotation center (ERC) and cornea; for example equal to 11.5 mm.

The ERC to lens distance is the distance along the visual axis of the eye in the primary position (usually taken to be the horizontal) between the ERC of the eye and the back surface of the lens, for example equal to 25.5 mm.

The Pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of wearer condition may be defined by a pantoscopic angle of −8°, a Cornea to lens distance of 12 mm, a Pupil-cornea distance of 2 mm, an ERC to pupil distance of 11.5 mm, an ERC to lens distance of 25.5 mm and a wrap angle of 0°.

Other conditions may be used. Wearing conditions may be calculated from a ray-tracing program, for a given lens.

As indicated previously, the gaze directions are usually defined from the center of rotation of the eye of the wearer.

Figure 6:
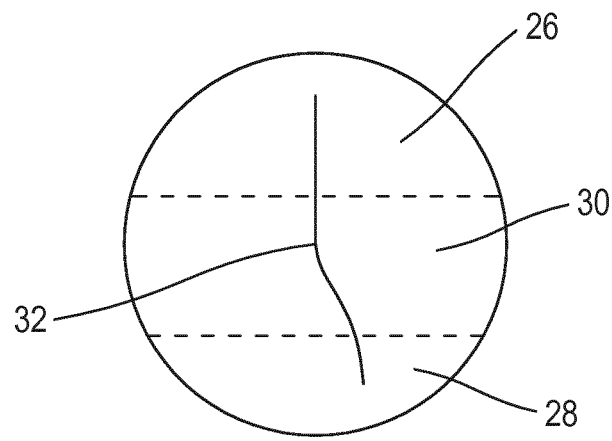
FIG. 6 show field vision zones of a lens.

The visual field zones seen through a lens are schematically illustrated in FIG. 6.

The lens comprises a far vision zone 26 located in the upper part of the lens, a near vision zone 28 located in the lower part of the lens and an intermediate zone 30 situated in the lower part of the lens between the far vision zone 26 and the near vision zone 28. The lens also has a main meridian 32 passing through the three zones and defining a nasal side and a temporal side.

The invention relates to a method for determining the optical power of an optical lens to be placed in front of the eye of a person and adapted for said person.

Figure 7:
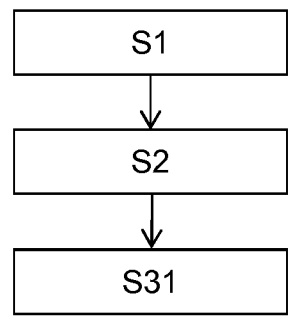
FIG. 7 is an illustration of a chart-flow of an embodiment of a optical power determining method according to the invention.

As illustrated on FIG. 7, the method according to the invention comprises:
  a first distance determining step S1,
  a second distance determining step S2,
  an optical power determining step S3.

During the first distance determining step S1, a first gazing distance is determined. The first gazing distance is the distance between the eye of the person and a first visual stimulus when the person gazes at said first visual stimulus in a given gazing direction with a first level of attention.

The distance between the eye of the person and the visual stimulus may be defined as the distance between the pupil of the person and a reference point of the visual stimulus.

Preferably, the visual stimulus is positioned in the median plan of the person, therefore the distance between both eyes of the wearer and the visual stimulus is the substantially the same.

The visual stimulus is typically text or images, for example printed or displayed on a screen such as a smartphone, a tablet computer, a computer screen or a TV screen.

The gazing direction of the person may be imposed, for example using a device allowing the person to see only in a specific gazing direction.

The person may simply be requested to gaze in a specific gazing direction. The gazing direction may be determined to check that the person is gazing in the specific gazing direction, for example using an eye tracking device.

During the first distance determining step, the person may adapt the distance between the visual stimulus and her/his eyes. In prior art method such distance is fixed. For example, when the eye care practitioner determines the optical power for near vision, his disposes a visual stimulus at a given distance, usually 40 cm for determining said optical power adapted for near vision.

The first distance corresponds to the distance at which the person places the first visual stimulus to gaze at said first visual stimulus with a first level of attention.

The distance may be determined by any known process, for example using:
  optical motion tracking, or
  ultrasonic rangefinder, or
  measuring tape,
  video camera and image processing (such as Visioffice® marker), or
  equip the person with smart frames, which identify the actions that carries the person (camera and image processing) and measure the distance to the object being gazed.

During the first distance determining step, the person is required to gaze at first visual stimulus with a first level of attention.

The level of attention of the person may be determined based on the person's ability to perform two tasks concurrently. For example, if the person responds within a short time to solicitations while performing a main task, it is considered that his level of attention towards the main task is small. Instead, if the person has a high response time, it may be considered that his level of attention towards the main task is high. For example, if the person takes more than 3 seconds to respond to the solicitation of the system, it may be considered that the level of attention is high (Kim and Rieh 2005), such time may be customized based on the person and/or his environment and/or activity.

The level of attention of the person may be determined based on physiological markers. For example, the heart rate of the person may be considered. The level of attention of the person towards the task may be linked to the difference between his current heart beat and his average heart beat. For example, if the heart beat is at least 15 beats per minute over average, one may consider that the level of attention of the person is high (Dehais et al, 2012), such level of difference may be customized based on the person and/or his environment and/or activity.

The level of attention of the person may be determined based on brain markers. Using near infrared spectroscopy (NIRS Near Infrared Spectroscopy) the ratio of deoxygenated hemoglobin level over the oxygenated hemoglobin (rSO2) level may provide an indication of the level of attention of the person. For example, if the ratio deoxygenated hemoglobin level over the oxygenated hemoglobin (rSO2) is less than 70%, one may consider that the level of attention of the person is high (see Braasch, 2010), such level of difference may be customized based on the person and/or his environment and/or activity.

The level of attention of the person may be determined using an eye tracker device.

Typically, the eye tracker device may be used to determine the pupillary diameter of the person. Knowing the usual pupil diameter of the person, one may determine variation of this diameter. If the diameter increases, one may consider that the level of attention of the person is high. If the diameter remains at its usual level, one may consider that the level of attention of the person is low. For example an increase of more than 1 mm may be considered as an indication of high level of attention (Hossain and Yeasin, 2014), such level of increase may be customized based on the person and/or his environment and/or activity.

The eye tracker device may be used to determine the blinking frequency of the person. If the blinking frequency drops it may be an indication that the level of attention of the person increases. For example a blinking frequency of less than 17 blinks per minute may be considered as an indication of high level of attention (Benedetto et al, 2011), such frequency may be customized based on the person and/or his environment and/or activity.

The eye tracker device may be used to determine the gaze direction of the person. For example the eye tracking device may be used to determine if the person has ambient or focal eye movement (Follet Le Meur Baccino, 2011). If the person performs focal movement, i.e. he is focused on details of his visual environment; one may consider that his level of attention is high. If the person has ambient movements, i.e. the person does not focus on only one given area of the environment, but switches regularly between different areas, one may consider that his level of attention is low.

During the second distance determining step S2, a second gazing distance is determined.

The second gazing distance is the distance between the eye of the person and a second visual stimulus when the person gazes at said second visual stimulus in said given gazing direction with a second level of attention.

The second level of attention is different from the first level of attention.

According to an embodiment of the invention, the second visual stimulus may be the same as the first visual stimulus. The level of attention is changed using environment parameter.

For example, during the first distance determining step the person is requested to read a text when music is playing around her/him and during the second distance determining step the person is requested to read the same text in silent environment. The level of attention required by the person is different when carrying out first and second distance determining step. The action of reading may be reading in his/her head or reading out.

According to a further embodiment, the second visual stimulus may be different from the first visual stimulus. For example, the first visual stimulus may be a text with punctuation and the second visual stimulus may be a text in which the punctuation has been removed, making the text more complex to read and understand, thus requiring a higher level of attention from the person when reading it.

The visual stimulus and the environment may also be adapted to the person. Indeed, different person may not require the same level of attention for given visual stimulus.

According to an embodiment, the first and second visual stimuli are at a near vision distance, for example carried out at distances smaller than 50 cm, such as between 30 and 50 cm. For example, the first and second visual stimuli are texts and the level of attention of the person is adapted based on the complexity of the texts to read.

According to an embodiment of the invention, the first and second visual stimuli are at an intermediate vision distance, for example carried out at distances greater than 50 cm and smaller than 1 m. For example, the first and second visual stimuli are displayed on a computer screen and the level of attention of the person is adapted based on the complexity of the task carried out by the person on the computer such as typing a text and watching a video or playing a video game.

During the optical power determining step, at least one optical power adapted for the person is determined based on the first and second distance.

According to an embodiment of the invention, a plurality of optical power associate with the gazing direction may be determined. For example a first optical power corresponding to the first distance and a second optical power corresponding to the second distance may be determined.

According to an embodiment of the invention, a single optical power is determined for the gazing direction.

The single optical power may be determined based on a single distance. The single distance is for example based on a combination of the first and second distances.

The single optical power may be determined based on a combination of first and second optical powers. The first and second optical powers are determined based respectively on the first and second distances.

Typically, the single distance or single optical power may be determined based on a weighted sum of respectively the first and second distances and the first and second optical powers.

The coefficients of the weighted sum may be determined based on at least on the frequency and/or amount of time spent daily by the person carrying out said activity with either a first or second level of attention.

For example if the person indicates spending 80% of his time carrying out near vision tasks that require a high level of concentration, the coefficient of the distance or optical power determined with the highest level of attention is weighted accordingly.

The single optical power may further be determined based on the blur tolerance of the person. For example, the person is asked to rate for each stimulus his blur tolerance.

For example, the person may indicate a rate of 2 to the question "can you accept blur vision when looking at a TV" and a rate of 4 to the question "can you accept blur vision when reading a contract". The optical power or distant associate to the activity "reading a contract" may have a weight twice as big as the weight of the optical power or distant associate to the activity "looking at TV".

Figure 8:
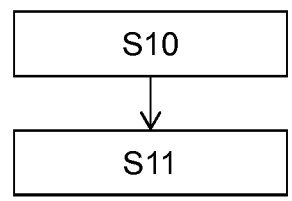
FIG. 8 is an illustration of a chart-flow of an embodiment of dioptric design providing method according to the invention.

As illustrated on FIG. 8, the invention further relates to a method for determining a dioptric function of an optical lens adapted for a person.

The method comprises:
a person data providing step S10, and
a dioptric function determining step S11.

During the person data providing step S10, person data comprising the person's ophthalmic prescription is provided. The ophthalmic prescription of the person comprises at least the first and second gazing distances determined according to the method of the invention.

Alternatively, the ophthalmic prescription may comprise an optical power determined based at least on the first and second distances or at least first and second optical powers determined based respectively on the first and second distances.

During the dioptric function determining step, a dioptric function is determined based at least on the first and second gazing distances.

Figure 9:
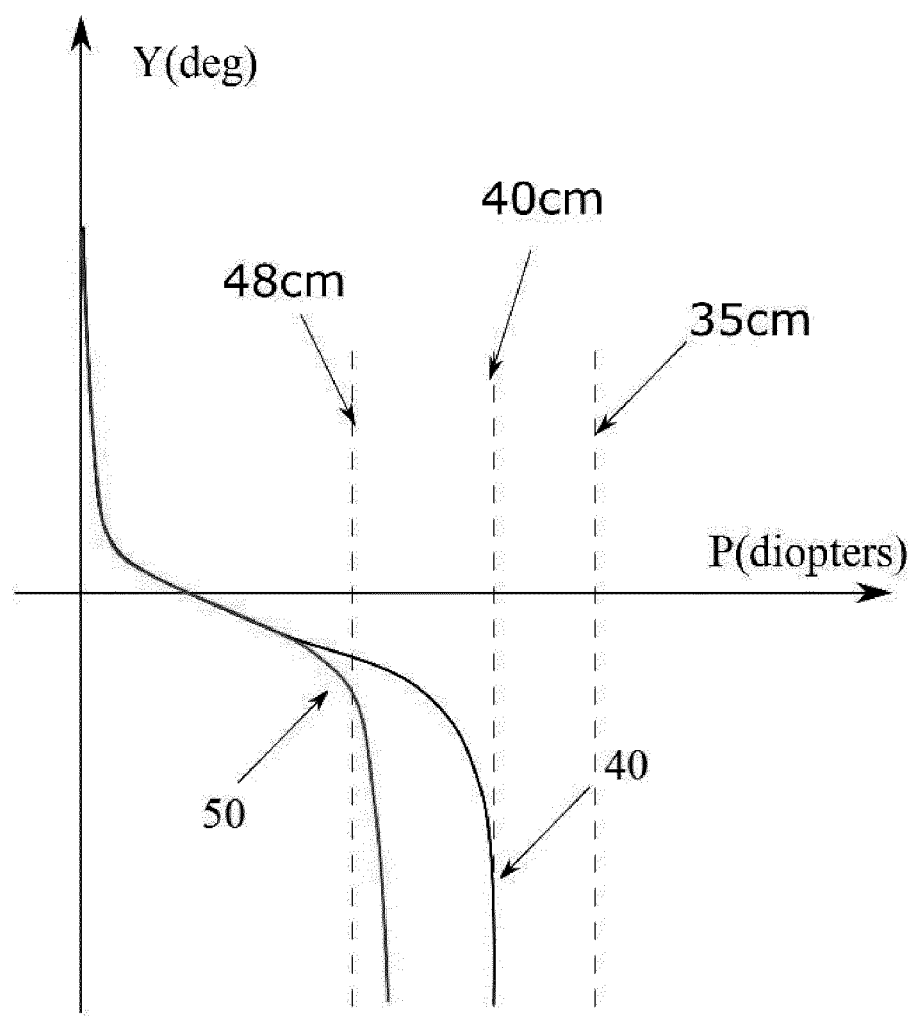
FIGS. 9 and 10 illustrate examples of implementation of the method according to the invention.

FIG. 9 shows optical power along the meridian of an ophthalmic lens determined according to an embodiment of the invention. The x-axes are graduated in diopters, and the y-axes give the height, in degrees, on the lens. The optical power profile 40 corresponds to a prior art optical power profile whereas the optical power profile 50 corresponds to an optical power obtained by a method of the invention.

In this example, a person indicates that she/he spends 80% of her/his time carrying out an activity that requires a low level of attention and 20% of her/his time carrying out an activity that require a high level of attention.

Using the method of the invention, one may determine that when that person carries out activity that require a high level of attention as a tendency to have the distance between the visual stimulus and his eyes of about 35 cm and when that person carries out activity that require a low level of attention his as a tendency to have the distance between the visual stimulus and his eyes of about 48 cm.

Based on such distances and time spent by the person, the lens designer may modify the dioptric function so as to have an addition Add=A*0.8+B*0.2, with A the addition so as to provide clear vision at 48 cm and B the addition to provide clear vision at 35 cm.

Advantageously, in this case the addition is lower that the addition required having a clear vision at 40 cm, corresponding to prior art methods. Thus it provides an optical design having fewer optical aberrations and that better fits the visual needs of the person.

Figure 10:
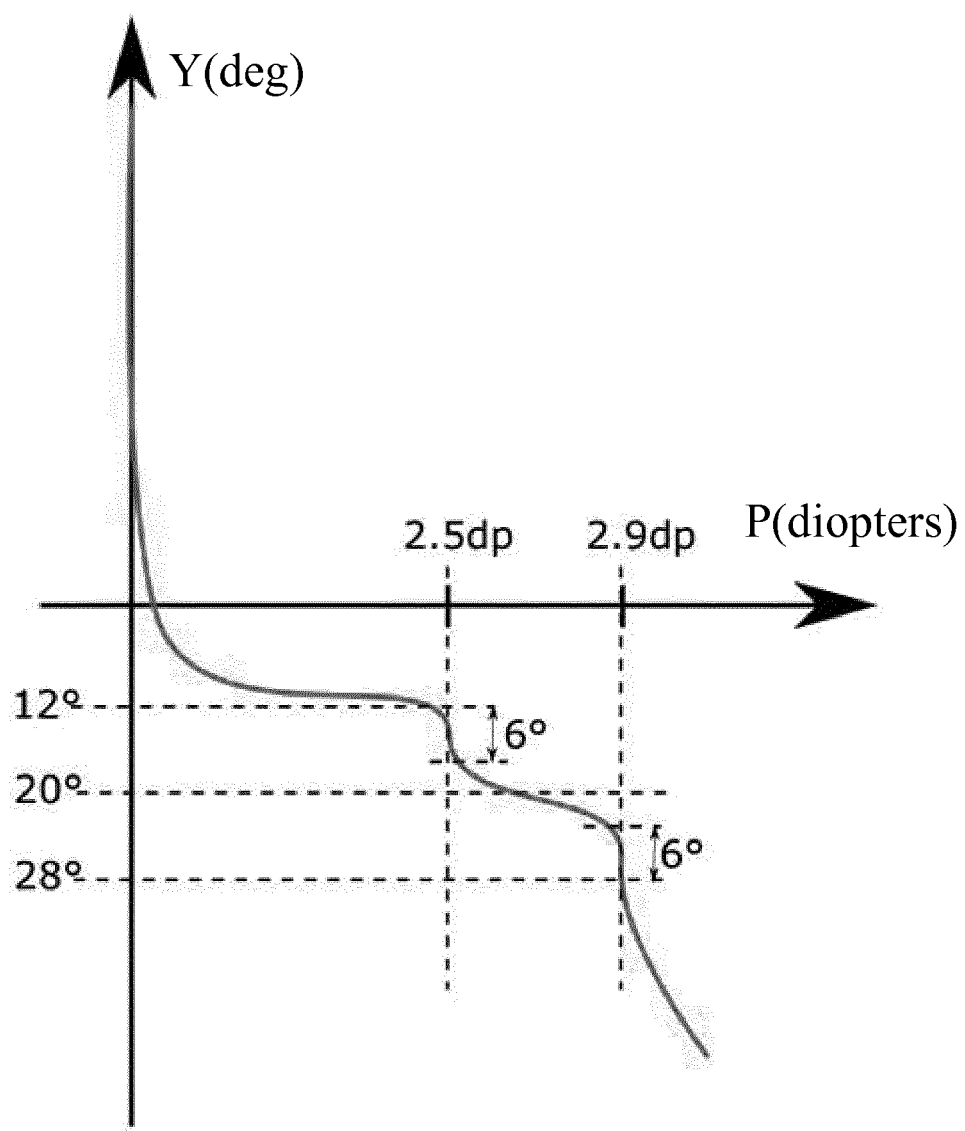

According to a further embodiment of the invention, illustrated on FIG. 10, the optical design may comprise not only a change of addition but a change in the way the optical power is distributed along the meridian of the ophthalmic lens.

As illustrated on FIG. 10, the optical design may be a multi stabilized zone design comprising at least a first and a second zone of stabilized optical power corresponding to different gazing distances or optical powers.

To provide a multi stabilized zone design the lens designer may determine an optical design, for example using known optimization method, that has two zones of stabilized optical power over an angle range of at least 4° with an optical power variation smaller than or equal to 0.1 diopter/deg between the two zones of stabilized optical power.

Preferably each zone of stabilized optical power is placed at angles on either side of the angle corresponding to the gazing direction in which the method of the invention is carried out.

The two zone of stabilized optical power may be of equivalent size in degrees.

In the example of FIG. 10, the gazing direction of the method of the invention is 20° and the measurements have provided that the person may need an addition of 2.5 diopters for low attentional level activities and an addition of 2.9 diopters for high attentional level activities.

The optical power have a first stabilized zone between 12° and 18° corresponding to an addition of 2.5 diopters and a second stabilized zone between 22° and 28° corresponding to an addition of 2.9 diopters.

Therefore when the person carries out activities that require a low level of attention he may use the first stabilized zone and when he carries out activities that require a high level of attention he may use the second stabilized zone.

Although in FIG. 10 both stabilized zones cover the same range of angles; the invention is not limited to such configuration. For example the first zone corresponding to the activities requiring a lower level of attention, such as watching a movie may cover a greater range of angles than the second zone corresponding to the activities requiring a high level of attention, such as reading a text.

Preferably, as illustrated on FIG. 10, the first stabilized zone does not extend to angles smaller than 0°, preferably not smaller than 10°.

The above examples are for near distance vision but can as well apply for intermediate distance vision.

The invention further relates to a method for manufacturing an ophthalmic lens adapted to a person comprising:
a lens blank providing step, during which a lens blank is provided,
a dioptric function providing step during which a dioptric function determined according to the method of the invention is provided,
a manufacturing step during which the optical lens blank is manufactured based on the dioptric function.

The invention has been described above with the aid of embodiments without limitation of the general inventive concept; in particular the mounted sensing device is not limited to a head mounted device.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for manufacturing an optical lens to be placed in front of an eye of a person and adapted for the person, the method comprising:
   determining a first gazing distance, the first gazing distance being a distance between the eye of the person and a first visual stimulus when the person gazes at the first visual stimulus along a given gazing vector with a first level of attention determined based on at least one physiological parameter of the person;
   determining a second gazing distance, the second gazing distance being a distance between the eye of the person and a second visual stimulus when the person gazes at the second visual stimulus along the given gazing vector with a second level of attention determined based on the at least one physiological parameter of the person, the second level of attention being different from the first level of attention;
   determining an optical power adapted for the person based on the first and second gazing distances; and
   manufacturing the optical lens adapted for the person from an optical lens blank, based on the determined optical power.

2. The method according to claim 1, wherein the first and second visual stimulus are at a near vision distance.

3. The method according to claim 1, wherein the first and second visual stimulus are texts and the level of attention of the person is changed based on the texts.

4. The method according to claim 1, wherein the first and second visual stimulus are at an intermediate vision distance.

5. The method according to claim 1, wherein the first and second visual stimulus are displayed on a screen of a computer and the level of attention of the person is changed based on a task carried out by the person on the computer.

6. The method according to claim 1, further comprising determining the given gazing vector.

7. The method according to claim 1, wherein the at least one physiological parameter of the person includes a heartbeat or a brain signal.

8. A method for manufacturing an optical lens adapted for a person, the method comprising:
- determining a first gazing distance, the first gazing distance being a distance between an eye of the person and a first visual stimulus when the person gazes at the first visual stimulus along a given gazing vector with a first level of attention determined based on at least one physiological parameter of the person;
- determining a second gazing distance, the second gazing distance being a distance between the eye of the person and a second visual stimulus when the person gazes at the second visual stimulus along the given gazing vector with a second level of attention determined based on the at least one physiological parameter of the person, the second level of attention being different from the first level of attention;
- determining a dioptric function based at least on the first and second gazing distances; and
- manufacturing the optical lens adapted for the person from an optical lens blank, based on the determined dioptric function.

9. The method of claim 8, wherein the dioptric function comprises a first zone having an optical power determined based on the first gazing distance and a second zone having an optical power determined based on the second gazing distance.

10. The method according to claim 8, wherein the dioptric function comprises a zone having an optical power determined based on a weighted sum of the first and second gazing distances.

11. The method according to claim 10, wherein coefficients of the weighted sum are determined based on at least a frequency and/or an amount of time spent daily by the person carrying out an activity with either a first or second level of attention.

12. An optical power determining device configured to determine optical power of an optical lens to be placed in front of eyes of a person and adapted for the person, the device comprising:
- a distance measuring device configured to measure a distance between a visual stimulus and the eyes of the person, the distance measuring device being an optical motion tracking device, a ultrasonic rangefinder device, a measuring tape, or a video camera;
- a memory configured to store computer executable instructions; and
- a processor to execute the computer executable instructions, wherein the computer executable instructions comprise instructions for:
  - determining a first gazing distance, the first gazing distance being a distance between an eye of the person and a first visual stimulus when the person gazes at the first visual stimulus along a given gazing vector with a first level of attention determined based on at least one physiological parameter of the person,
  - determining a second gazing distance, the second gazing distance being a distance between the eye of the person and a second visual stimulus when the person gazes at the second visual stimulus along the given gazing vector with a second level of attention determined based on the at least one physiological parameter of the person, the second level of attention being different from the first level of attention, and
  - determining at least one optical power adapted for the person based on the first and second gazing distances, the at least one optical power used in manufacturing the optical lens adapted for the person from an optical lens blank.

13. The device according to claim 12, further comprising a display configured to display the first and second visual stimulus.

* * * * *